United States Patent Office 3,396,390
Patented Aug. 6, 1968

3,396,390
PROXIMITY WARNING SYSTEM
Robert F. Riggs and Demster L. Teague, Charlottesville, Va., assignors to Sperry Rand Corporation, a corporation of Delaware
Filed Jan. 27, 1967, Ser. No. 612,275
9 Claims. (Cl. 343—11)

ABSTRACT OF THE DISCLOSURE

An automatic proximity warning device for indicating the presence and bearing of an intruding craft passing through one or more guard rings circumscribing a craft to be protected.

---

The invention herein described was made in the course of or under a contract or subcontract thereunder, with the Maritime Administration of the Department of Commerce.

Background of the invention

The present invention pertains to an automatic proximity warning system for solving the problem of indicating the direction and range of any number of intruding craft into the proximity region of another craft to be protected. It has been determined that many of the maritime collision situations in the past have not been discovered in sufficient time to avert collision and of those that have the greatest losses result from unnecessary maneuvers initiated to counter collision situations which do not actually exist. It is therefore desirable to provide automatic proximity warning apparatus which not only indicates presence but also range and bearing with respect to an intruding craft which may be on a collision course.

Summary of the invention

The present invention utilizes a plurality of guard rings circumscribing the protected craft which results in several advantages over simple proximity warning devices. The plural guard ring configuration permits continual search of intruding craft without saturation of the system. Further, it results in a high probability of detection of the intruding craft by utilizing narrow guard rings. Since it is resettable, any number of intruders can be detected. By utilizing a scanning system that provides a bearing cue in addition to an audible and/or visual alarm and utilizing guard rings of known range, the human operator is aided in rapidly ascertaining bearing and range of the intruding craft without requiring constant surveillance of the display on his part. Further, the use of a multiplicity of guard rings with bearing cues given as the intruding craft passes through each guard ring provides an indication of the rate of change of bearing between detections and thus an indication of the probability of collision is provided.

Therefore, the present invention concerns an automatic proximity warning device for indicating the presence, range and bearing of an intruding craft with respect to a protected craft in which sensor means are mounted on the protected craft for providing signals representative of the range and bearing of the intruding craft with respect to the protected craft with guard ring generating means responsive to the range signals for effectively defining a plurality of guard rings at least partially circumscribing the protected craft wherein each of the guard rings corresponds to a predetermined range, and there is alarm and display means coupled to the sensor means and the guard generating means for providing discrete indications of presence, range and bearing as an intruding craft intersects each successive guard ring.

Brief description of the drawings

Referring now to the drawings.

Description of the preferred embodiment

Figure 1:
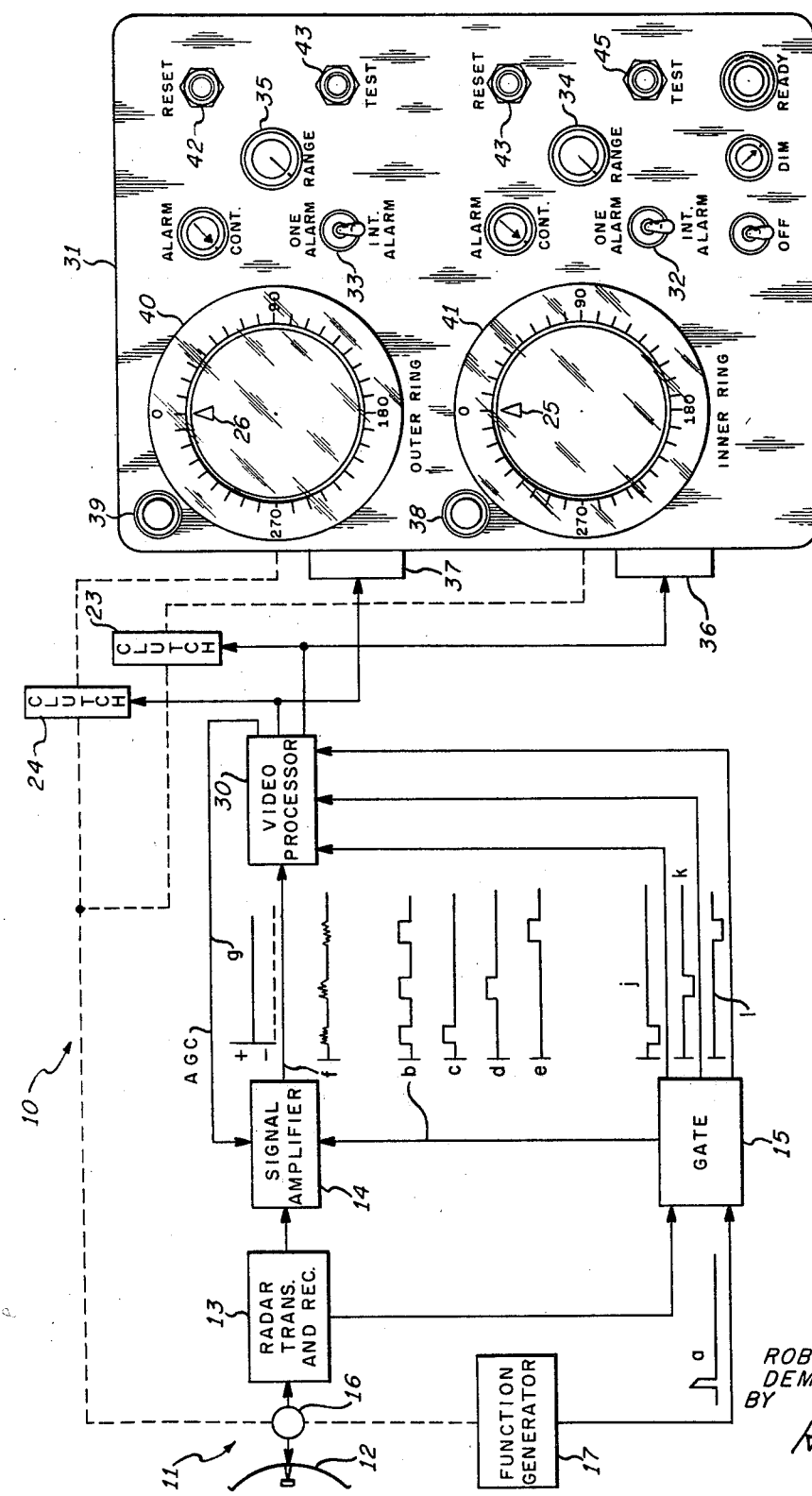
FIG. 1 is a schematic diagram of the proximity warning system of the present invention.

Referring now to FIG. 1, an automatic proximity warning system 10 is shown used with a conventional surface search radar 11 of the type used aboard ship having an antenna 12 and a radar transmitter and receiver 13 that is usually connected to a plan position indicator (PPI— not shown). Alternatively, the system 10 may be provided with its antenna-transceiver system.

Figure 2:
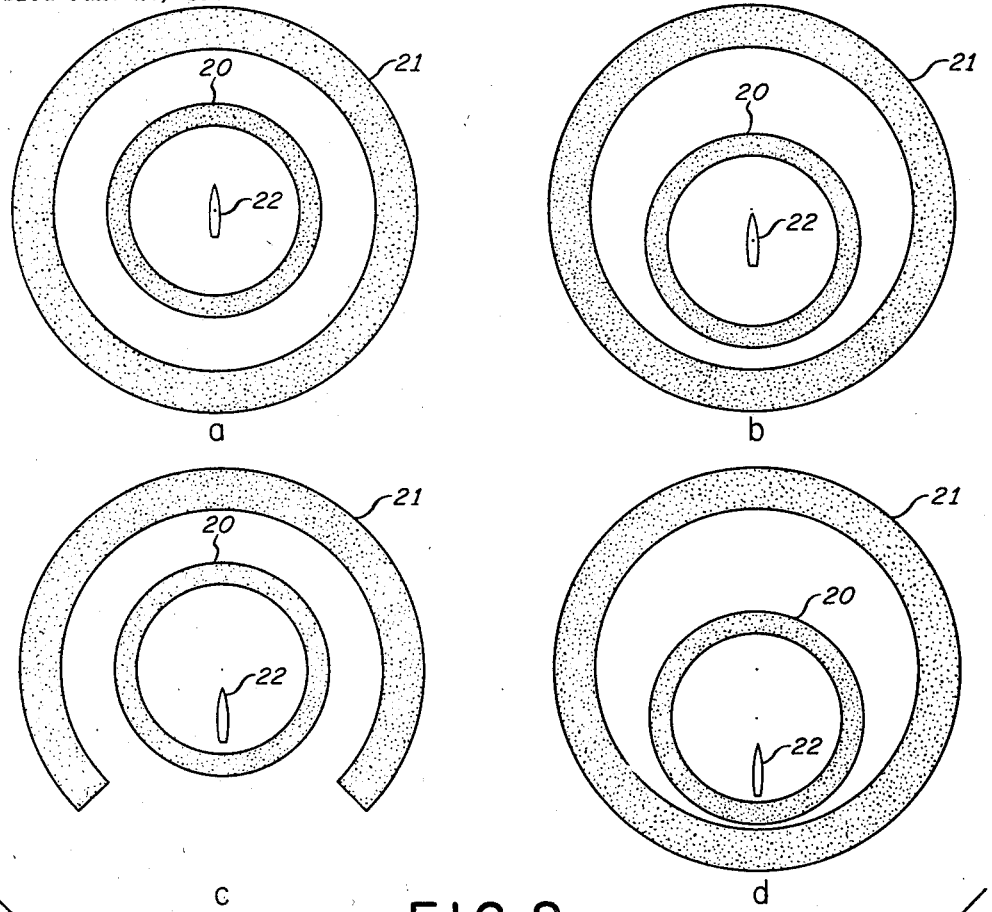
FIG. 2 is a plan view showing a protected craft and possible guard ring configurations.

The radar transmitter and receiver 13 is connected to a signal amplifier 14 which is responsive to the video detected echoes. The transmitter and receiver 13 also provides trigger pulses $a$ to a range gate generator 15. The range gate generator 15 defines the ranges corresponding to the guard ring ranges shown in FIG. 2, in a manner to be more fully explained. An antenna scanner 16 may be connected through function generator means 17 to the range gate generator 15 to vary the guard ring ranges as a function of bearing to provide for relative positioning of the inner guard ring 20 and the outer guard ring 21 with respect to the ship 22 shown in FIG. 2. The function generator means 17 may comprise for example a non-linear potentiometer associated with each guard ring to provide the desired functions as shown in FIG. 2. The antenna scanner 16 is also connected through electromagnetic clutches 23 and 24 to position an inner ring bearing pointer 25 and an outer ring bearing pointer 26 respectively in synchronism with the rotation of the antenna 12 except when an intruder is detected in one of the guard rings at which time the particular clutch is disengaged thereby stopping the rotation of the pointer associated with that clutch to provide an indication of the bearing to the intruder.

The signal amplifier 14 may be a conventional gated amplifier with automatic gain control (AGC). The amplifier 14 is normally biased off and is gated on by one of three range gates $b$ from the range gate generator 15. The amplifier 14 accepts only those target returns which are coincident with either the first or second range gates $c$ and $d$ corresponding to the inner and outer guard rings 20 and 21, respectively. The receiver noise is sampled by a third range gate $e$ located at a target free range. An AGC voltage $g$ proportional to the receiver noise is applied to the amplifier 14 to maintain a constant average noise level and thus set the system detection threshold. When used with an existing radar system, the amplifier 14 may be connected to the radar IF prior to the first gain controlled stage.

The range gate generator 15 accepts a system trigger $a$ from the radar transmitter and receiver 13 or may generate a basic timing trigger from its own transceiver system. Each trigger pulse $a$ causes the range gate generator 15 to generate three serialized control gates $b$ for the amplifier 14 and three parallel control gates $j, k, l$ for a video processor 30. The video processor 30 is connected to receive a serialized video output *f* from the amplifier 14 and converts it to three parallel information channels. The portion of the signal *f* in time coincidence with the separator gate *j*, i.e., inner ring video, is transmitted to an inner guard ring portion of an alarm-display 31 and to the clutch 23. The portion of the signal *f* in time coincidence with separator gate *k*, i.e., outer ring video, is transmitted to an outer guard ring portion of the alarm-display 31 and to the clutch 24. The portion of the signal *f* in time coincidence with the separator gate *l*, i.e., receiver noise, is transmitted to an AGC detection and threshold circuit in the video processor 30 to provide a gain control voltage *g* for the gated amplifier 14. The control voltage *g* varies with the receiver noise and functions to maintain a constant detection threshold level for the inner guard ring and outer guard ring target detection circuits.

As shown in FIG. 2, the automatic proximity warning system of the present invention indicates the presence and bearing of an intruder passing through one or more guard rings about the ship or radar site 22. The depth of the outer guard ring 21 is typically 1 to 3 miles and the depth of the inner guard ring 20 is typically 0.5 mile. Each guard ring depth is preset and the range from the ship 23 to the guard rings 20 and 21 is adjustable in a manner to be explained. The outer guard ring 21 may completely encircle the ship 22 or may partially encircle it depending upon the desired use and type of installation.

In normal operation, the system 10 is in the following condition as indicated on the alarm-display 31 in FIG. 1 with no intruder in either guard ring:

(1) The bearing indicator pointers 25 and 26 rotate in synchronism with the radar scanner 16.

(2) The alarm mode switches 32 and 33 are in the one alarm position.

(3) The range controls 34 and 35 are set at ranges commensurate with craft speed and environment.

(4) The audible alarms 36 and 37 are silent.

(5) The visual alarms 38 and 39 are dark.

When an intruder enters the outer guard ring 21, the bearing indicator 26 stops rotating to indictae the relative bearing of the intruder. The indicator lamp 39 lights red and a slit in the side of the indicator lamp housing illuminates the bearing dial 40. The audible tone alarm 37 also sounds. These conditions continue until one of two actions is taken by the operator. If the reset button 42 is pressed, the system 10 returns to normal. If the intruder is still within the outer guard ring 21 during the next antenna scan, the alarm process described above is repeated. An alternate action is to place the alarm mode switch 33 in the intermittent alarm position. If the intruder is still within the outer guard ring on successive antenna scans, a momentary audible alarm 37 and visual alarm 39 occurs each time the antenna 12 scans an intruder. The bearing indicator 26 continues to rotate and bearing information is obtained by noting the position of the pointer 26 with respect to the bearing dial 40 when an alarm occurs. With the mode switch 33 in the intermittent alarm position, the outer guard ring 21 has multiple target capabilities.

When an intruder enters the inner guard ring 20, the bearing indicator 25 stops rotating to indicate the intruder bearing, the indicator lamp 38 lights red and a slit in the side of the indicator lamp housing illuminates the indicator dial 41. The audible tone alarm 36 sounds which has a different tone than the alarm. The alarm conditions continue until one of two actions is taken by the operator. If the reset button 43 is pressed, the system is returned to normal and the above alarm cycle is repeated if the intruder is still within the inner guard ring 20 on the next antenna scan. An alternate action is to place the alarm mode switch 32 in the intermittent alarm position. If the intruder is still within the inner guard ring 20 on successive scans, a momentary audible alarm 36 and a visual alarm 38 occurs. The bearing indicator 25 continues to rotate and bearing information is obtained by noting the position of the pointer 25 with respect to the bearing dial 41 when an alarm occurs.

A test switch 44 may be utilized to introduce a simulated target video signal into the outer guard ring channel for a self-test while a test switch 45 is for inner ring self-test. The control of each guard ring channel is accomplished independently of the other channel.

Figure 3:
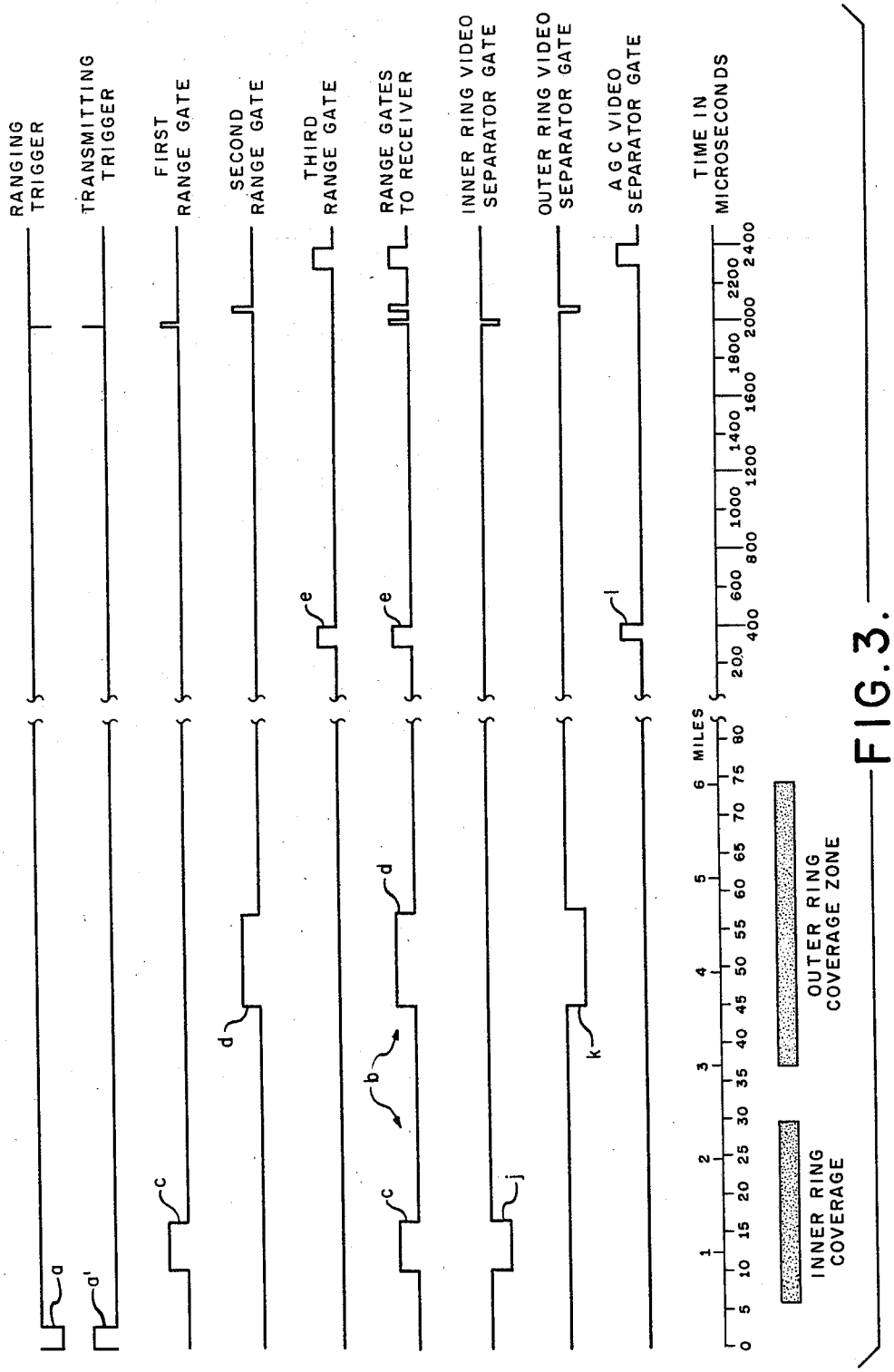
FIG. 3 is a timing diagram showing pulse relationships in which the lower end of the time scale has been expanded to show a typical coverage zone in greater detail.
Figure 4:
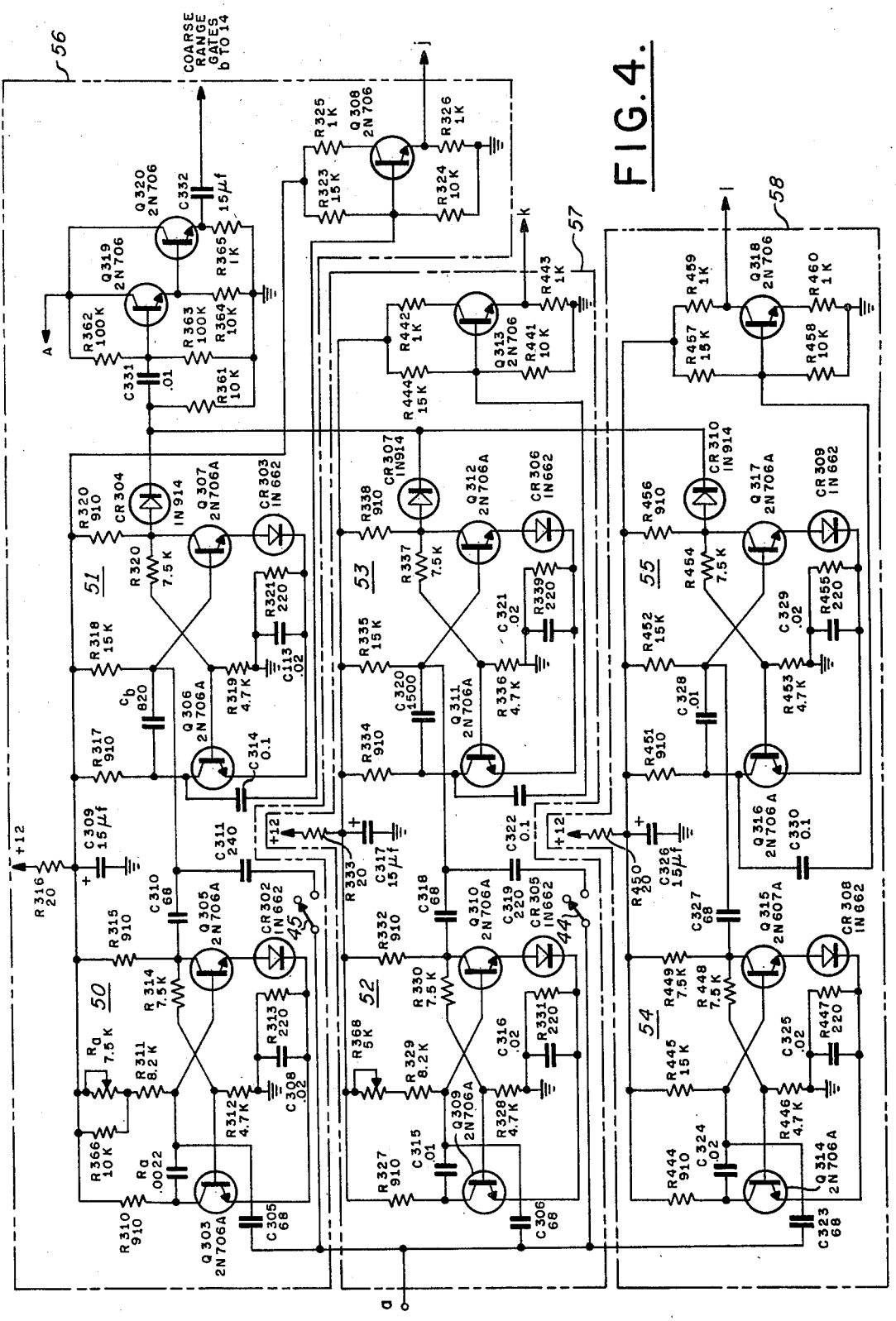
FIG. 4 is an electrical wiring schematic of the range gate generator.
Figure 5:
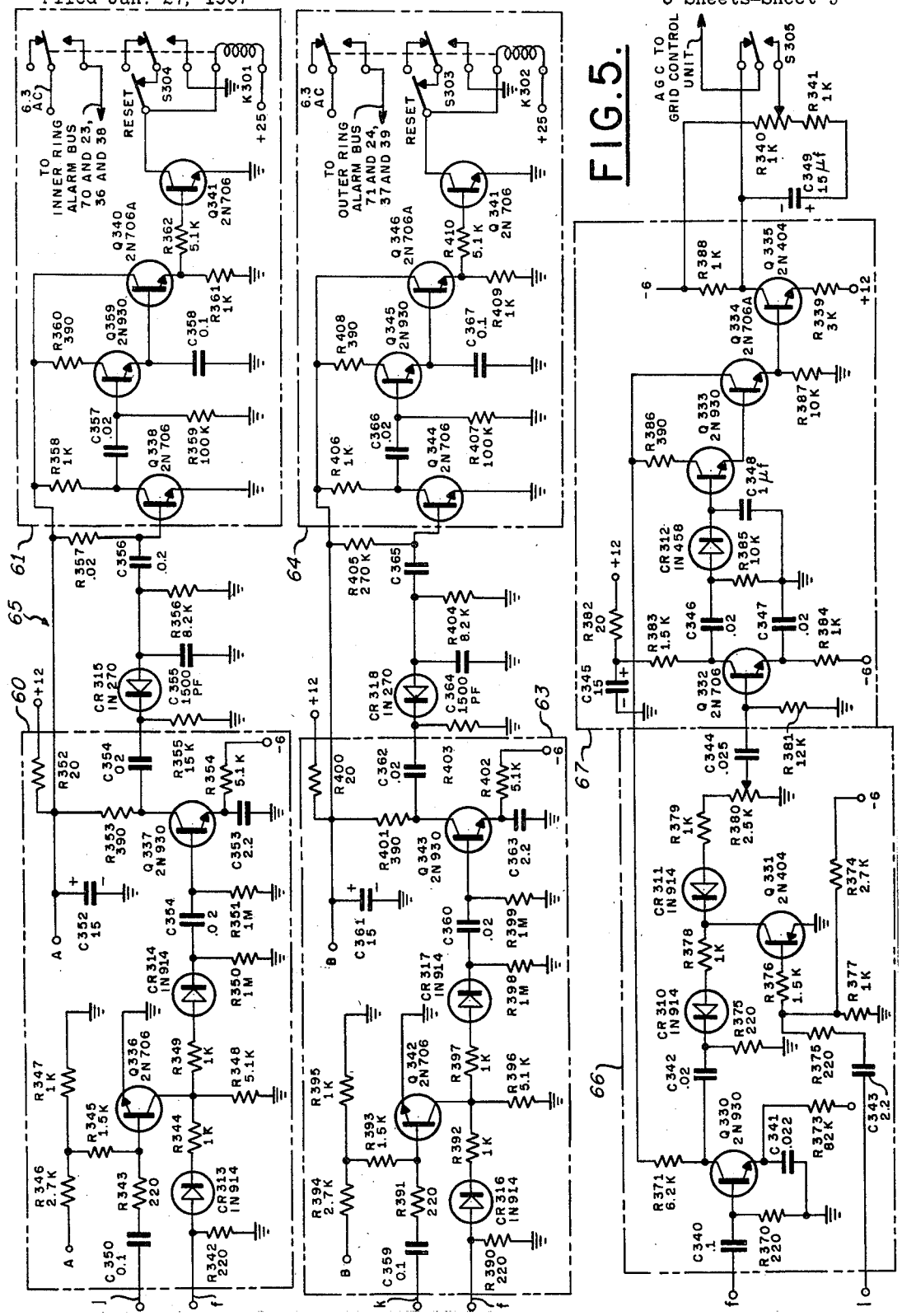
FIG. 5 is an electrical wiring schematic of the video processor.

A detailed explanation of the operation of the system 10 will now be provided by referring to FIGS. 3, 4 and 5. In the timing diagram of FIG. 3, the lower end of the time scale has been expanded to show pulse relationships and a typical coverage zone in greater detail.

If the present invention is used with an existing radar system, the ranging trigger *a* is obtained from the radar system. If this device is provided with its own transceiver system, the ranging trigger *a* and transmitting trigger *a'* are generated by a trigger generator (not shown).

The three range gates (*c*, *d* and *e*) and their associated delays are obtained from six monostable multivibrators 50 through 55. The inner ring range gate *c* is generated by the multivibrator 50. A variable delay trigger for the multivibrator 51 is obtained from the variable delay multivibrator 50. The delay time between the ranging trigger *a* and the inner ring range gate *c* is adjusted by the control knob 34 on the display 27. Thus the range from the ship 22 to the inner guard ring 20 is established by the multivibrator 50. The depth of the inner guard ring (width of gate *c*) is determined by the multivibrator 51. The variable range from the ship 22 to the outer guard ring 21 gate *d* is determined by the multivibrator 52 and the control knob 35 on the alarm-display 31. The depth of the outer guard ring width of gate *d* is determined by the multivibrator 53. The multivibrator 54 generates a fixed delay trigger for the AGC gate multivibrator 55 which functions to generate gate *e*. The delay between the ranging trigger *a* and the AGC gate *e* is such that the gate *e* occurs at a target free range.

The three range gates *c*, *d* and *e* are added in a gate summing circuit to form a train of range gate pulses *b*. These serialized pulses *b* gate the amplifier 14 on three times between each radar transmitting period. The range gate generators 56, 57 nad 58 also supply three parallel gate outputs *j*, *k* and *l* to the video separators in the video processor 30.

Specifically, each range gate generator such as the inner guard ring range gate generator 56 consists of two saturated monostable multivibrators 50 and 51 in tandem. The first multivibrator 50 generates a variable delay trigger. In the stable state, the transistor Q305 is saturated and the transistor Q304 is cut off. The emitter bias for the transistors Q304 and Q305 is developed across the resistor R313. The capacitor C308 provides a low impedance to ground for pulses and holds the emitter bias voltage constant during switching. A negative trigger pulse *a* is differentiated by the capacitor C305 and applied to the base of the transistor Q305. This narrow pulse reverse biases the transistor Q305 and collector current ceases. The collector voltage rises from 3 volts to 11 volts. This voltage rise, coupled to the base of the transistor Q304 through voltage divider resistors R312 and R313 forward biases the transistor Q304 switching it from off to a saturated condition. The collector voltage of the transistor Q304 drops to positive 3 volts and the voltage across the capacitor $C_a$ will reverse bias the transistor Q305. The diode CR302 protects the base-to-emitter function of the transistor Q305 against burnout when the large bias is applied. The transistor Q305 will remain off until the capacitor $C_a$ charges to a positive value greater than the emitter bias developed across the resistor R313. The capacitor $C_a$ charges toward positive 12 volts through the resistor $R_a$ and transistor Q304. Thus, the time constant $R_aC_a$ and the voltage difference between the supply and saturated collector voltage of the transistor Q304 determine the off time for the transistor Q305. When the capacitor Ca charges to a level such that the base-to-emitter voltage of the transistor Q305 is positive, it starts to conduct. The increasing flow of collector current through the resistor R315 reduces the forward bias voltage for the transistor Q304. This process continues until the transistor Q305 is once again saturated and the transistor Q304 is cut off. This is the stable state and the multivibrator 50 will remain in this condition until another trigger pulse a occurs.

During the off period of the transistor Q305, a positive pulse is developed across the collector load resistor R315. Since the off time of the transistor Q305 is determined by values of the resistor Ra and the capacitor Ca, the width of the positive pulse is determined by this time constant. The positive output pulse from the transistor Q305 is differentiated by the capacitor C310 and applied to the base of the transistor Q307. The positive spike which occurs at the leading edge of the differentiated pulse serves no purpose. The negative spike which occurs at the trailing edge of the differentiated pulse serves as a delayed trigger for the range gate multivibrator 51. The amount of delay, with respect to the basic timing pulse, is determined by adjustment of the variable resistor Ra.

Operation of the range gate multivibrator 51 is identical to that described for trigger delay multivibrator 50 except that the timing network composed of the resistor R318 and the capacitor Cb is not variable. A positive range gate pulse c is developed across the collector load resistor R322. The output pulse from the collector of the transistor Q307 is coupled to a line driver amplifier through the diode CR304. When the other range gate generators 57 and 58 are transferring positive pulse information to the amplifier 14, the diode CR304 is reverse biased to prevent spurious trigger pulses from reaching the base of the transistor Q306.

A negative pulse j, coincident with the positive range gate pulse c, is developed across the collector load resistor R317 of the transistor Q306. This negative range gate j is coupled through an emitter follower buffer amplifier, Q308, to the video separator circuit 60 in the video processor 30 of FIG. 5.

Each guard ring range gate generator incorporates a self-test switch such as 44 and 45. Depressing this switch bypasses the delay multivibrator and substitutes the system trigger at the base of the range gate multivibrator. This moves the leading edge of the range gate back to zero time and activates the amplifier 14 during the transmitting interval. As the transmitter fires, the transmitted pulse energy coupled through the receiving system produces an alarm.

The outer guard ring range gate generator 57 determines the position and depth of the outer guard ring gate pulse d. Except for timing, it functions identically to the inner guard ring range gate generator 56. The delay between the start of the range gate and the basic timing pulse is adjustable by the control knob 35. The width of the range gate is fixed.

The AGC range gate generator 58 determines the position and depth of the receiver AGC gate pulse e. Except for timing, it functions identically to the inner guard ring range gate generator 56. The delay between the start of the range gate and the basic timing pulse is fixed to insure that the AGC gate will always occur in a target free area.

The purpose of the video processor 30 shown in detail in FIG. 5 is to separate the serialized single-channel output of the amplifier 14 into three separate parallel information channels, detect the presence of a signal return in either of the guard ring channels, and maintain a constant noise threshold reference level (AGC).

The inner guard ring video separator 60 is normally off. The video separator 60 is gated on by gate j from the range gate generator 56. Thus, the separator 60 will accept only that information which is in time coincidence with the inner guard ring range gate j. A signal return passing through the video separator 60 is amplified, detected and integrated in the integrator amplifier 61. When the D.C. output of the integrator 61 rises to a predetermined level, an alarm relay K301 in the inner guard ring alarm circuit operates to actuate audible and visual alarms and the clutch 23 to provide a bearing indication as described with respect to FIG. 1.

Operation of the outer guard ring video separator 63 is identical to that of the separator 60 except that the separator 63 is gated on by the range gate k and passes only that information in time coincidence with the gate k. Operation of the outer guard ring integrator amplifier 64 is identical to that of the amplifier 61.

The Automatic Gain Control Unit (AGC) 65 is gated on by the third range gate l. Since this gate occurs in a target free area, only receiver noise is detected. The D.C. output of the AGC unit, which is proportional to the average noise level of the receiver, is applied as a negative bias to the receiver. Hence a control loop is closed and functions to keep the average receiver noise level constant.

Specifically, the video separator 60 of the inner ring video processor functions as a video switch which is normally off. In its quiescent state, the grounded emitter stage of the transistor Q336 is saturated on. Forward bias obtained from the voltage divider resistors R346 and R347 is applied through the current limiting resistor R345 to the base of the switch Q336. The switch Q336 provides a low impedance to ground for video signals, and the collector voltage applied at the junction of the resistors R344 and R349 reverse biases the diode CR313. In this quiescent state, no video signals are developed across the switch load resistor R348. When the negative range gate j is applied through the capacitor C350 and resistor R343, the switch Q336 is cut off, and the switch Q336 is held open during the gate interval. Both the signal shunt to ground and the diode back bias are removed, and positive video signals are transmitted through the diodes CR313 and CR314. Negative switching transients and negative video signals back bias the diode CR313 and the diode CR314 and are not passed through the separator. Positive video pulses cause the diodes CR313 and CR314 to conduct, and video is developed across the switch load resistor R350. The gated video is coupled through the capacitor C351 to the base circuit of the amplifier stage transistor Q337. The bias for the amplifier Q337 is established by the resistors R354 and R351. The emitter is bypassed by the capacitor C353 which provides a low impedance to ground for pulses. Amplified negative video pulses are developed across the collector load resistor R353.

At the conclusion of the first range gate j, the switch Q336 again conducts and the video separator 60 rejects video inputs until the next range gate j occurs and the cycle is repeated.

The video separator output is coupled from the collector of the amplifier Q337 through the capacitor C354 to the integrating-amplifier section 61. The inner ring video pulses, amplified by the transisthor Q338, are developed across the collector load resistor R358. Base bias is determined by the resistor R357. Positive pulses coupled through the capacitor C357 are developed across the resistor R359 and the base of the detector Q339. The detector Q339 is biased at cut off in the absence of a video signal. When a positive video pulse is applied to the base, the detector Q339 is forward biased, and the integrating capacitor C358 charges rapidly through the detector Q339. At the conclusion of the video pulse, the detector Q339 is cut off and the capacitor C358 discharges slowly through the high impedance input of the emitter follower Q340. Most of the voltage developed across the capacitor C358 is retained for the interval between range gate pulses, e.g., 2000 microseconds. In the absence of a target return, the detected receiver noise video establishes a small residual D.C. voltage across the capacitor C358. This voltage establishes the quiescent operating point for the D.C. amplifier stages. The presence of a target return is indicated by a rise in the D.C. voltage developed across the integrator C358. The D.C. voltage across the capacitor C358 forward biases the emitter follower Q340. The D.C. output of the emitter follower Q340 developed across the resistor R361, is directly coupled through the current limiting resistor R362 to the base of the alarm relay amplifier Q341. The collector of the amplifier Q341 is returned to plus 25 volts through the sensitive relay K301. The quiescent collector current of the amplifier Q341 is determined by the D.C. voltage developed across the capacitor C358 due to average receiver noise level and is insufficient to cause the relay K301 to operate. An increase in the collector current due to target return operates the relay K301 which in turn actuates the audible alarm 36 as well as the lamp 38 and disengages the clutch 23. If the switch S304 is in the continuous alarm position, the relay K301 locks operated through the reset switch S304 and will remain operated until the reset switch is depressed. In the intermittent alarm mode, the locking circuit for the relay K301 is open and the alarm relay operates momentarily each time the target return causes an increase in current flow through the relay K301.

The outer ring video processors 63, 64 function identically to the inner ring video processor except the alarm 37 and the lamp 39 are actuated and the clutch 24 is disengaged.

The video separator section 66 of the AGC unit 65 functions as an amplifier and video switch to pass only that portion of the receiver video which is coincident with the third range gate. The video pulses developed across the load resistor R370 are amplified by the transistor Q330. The emitter bias for the transistor Q330 is determined by the resistor R373. The resistor R373 is bypassed by the capacitor C341 to provide a low impedance path to ground for the video signals. Amplified negative video pulses are developed across the collector load resistor R371 and coupled through the capacitor C342 to the video switch input resistor R372. The switching transistor Q331 is normally saturated on. The forward bias, obtained from the voltage divider resistors R374 and R372, is applied to the base through the current limiting resistor R376. The switch Q331 provides a low impedance to ground for video signals; and the collector voltage, applied at the junction of the resistor R378 and diode CR311, reverse biases the diode CR310. In its quiescent state, no video signals are developed across the switch load resistor R380. When the positive third gate l is applied through the capacitor C343 and resistor R375, the switch Q331 is held open during the gate interval; both the signal shunt to ground and the diode bias are removed and negative video signals are transmitted through the diodes CR310 and CR311. Positive switching transients and positive video signals back bias the diodes CR310 and CR311 and are not passed through the separator.

Since the third range gate l is in a target-free area, video pulses at the separator output are due entirely to receiver noise. These noise video pulses are coupled through the capacitor C344 to the base circuit of the amplifier Q332 in the integrator amplifier section 67. The emitter bias for the amplifier Q332 is determined by the resistors R384 and R381. The resistor R384 is bypassed by the capacitor C347 to provide a low impedance path to ground for video signals. Amplified positive pulses are developed across the collector load resistors R383 and R385 which are coupled by the capacitor C346. The diode CR312, capacitor C348, and the input impedance of the transistor pair Q333–Q334 constitute a peak detector, integrating circuit. During positive excursions, the capacitor C348 charges through the low impedance diode CR312. In the absence of a signal, the diode CR312 is back biased and the capacitor C348 discharges slowly through the high input impedance of the transistor Q333.

The D.C. voltage developed across the emitter resistor R387 is proportional to the average receiver noise level. The base of the D.C. amplifier Q335 is directly coupled to the resistor R387. The emitter bias for the amplifier Q335 is developed across the resistor R339. A negative voltage developed across the collector load resistor R388 is applied as a negative bias to the amplifier 14. Since the magnitude of this negative voltage is proportional to the receiver noise level, the AGC unit functions to maintain the average receiver noise level constant. Noise level changes are compensated for by changing the receiver bias levels. Thus the detection thresholds of the inner and outer ring alarm units are held constant.

Figure 6:
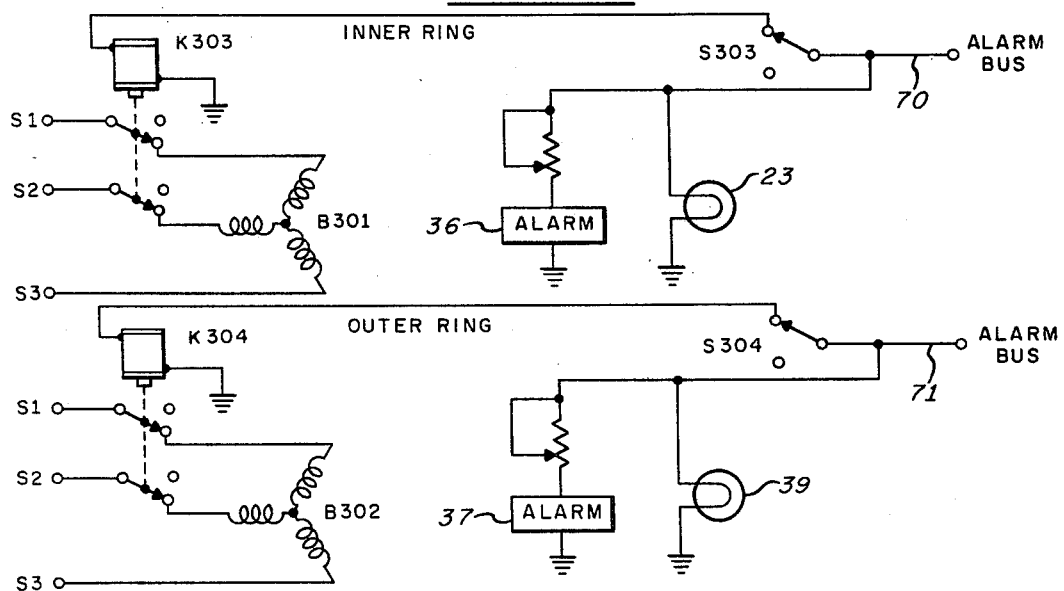
FIG. 6 is an electrical wiring schematic of an alternative embodiment of the alarm and display circuit.

An alternative embodiment for actuating the bearing indicators 25 and 26 and their respective alarm circuits is shown in FIG. 6. The stator leads S1, S2 and S3 of two receiving synchros B301 and B302, are connected to the corresponding stator leads of a transmitter synchro (not shown) that is gear driven in synchronism with the antenna scanner 16 shown in FIG. 1. The receiving synchros B301 and B302 follow the transmitting synchro; therefore, the angular position of the pointers 25 and 26 attached to the shafts of the respective synchros of B301 and B302 rotate in synchronism with the antenna 12. The instant a target is detected by the inner ring alarm unit, the alarm bus 70 is energized and the relay K303 operates through the alarm mode switch S303. The relay K303 opens drive leads S1 and S2 to synchro S303. The relay K303 opens drive leads S1 and S2 to synchro B301 which then ceases to rotate. The stationary pointer 25 then indicates the bearing of the target producing the alarm; the audible alarm 36 sounds; and the indicating light 38 glows.

If the alarm mode switch is in the intermittent mode, the operator circuit for the relay K301 shown in FIG. 5 is open and the synchro B301 continues to rotate when the alarm bus 70 is energized. The audible and visual alarms 36 and 38 respectively indicate momentarily and the bearing is determined by noting the position of the pointer 25 when the momentary alarm occurs.

The outer ring alarm unit operates in a similar manner when a target is detected in the outer guard ring.

It will be appreciated that a radar, sonar, laser or any other active sensor that delivers range and bearing can be utilized as the prime sensor in the present invention. Typical components and component values are indicated in FIGS. 4 and 5.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. An automatic proximity warning device for indicating the presence, range and bearing of an intruding craft with respect to a protected craft comprising
    sensor means mounted on said protected craft for providing signals representative of the range and bearing of said intruding craft with respect to said protected craft,
    guard ring generating means coupled to said sensor means for effectively defining a plurality of guard rings at least partially circumscribing said protected craft,
    each of said guard rings corresponding to predetermined ranges, and
    alarm and display means coupled to said sensor means and said guard ring generating means for providing discrete indications of presence, range and bearing as an intruding craft intersects each successive guard ring.

2. An automatic proximity warning device of the character recited in claim 1 in which said guard ring generating means includes means for defining at least first and second guard rings each of which at least partially circumscribes said protected craft at first and second predetermined functions of ranges respectively.

3. An automatic proximity warning device of the character recited in claim 1 in which said guard ring generating means includes means for defining the depth of each of said guard rings during which said discrete indications may be continuously provided.

4. An automatic proximity warning device of the character recited in claim 1 in which said guard ring generating means includes means for varying the range of each of said guard rings.

5. An automatic proximity warning device of the character recited in claim 1 including function generating means for defining the function of said predetermined range with respect to predetermined guard rings.

6. An automatic proximity warning device of the character recited in claim 1 in which said guard ring generating means includes first and second cascaded multivibrator means with respect to each of said guard rings, each of said first multivibrator means being adjustable for defining the range of its associated guard ring and each of said second multivibrator means for defining the depth of its associated guard ring.

7. An automatic proximity warning device of the character recited in claim 1 in which said alarm and display means includes bearing indicating means corresponding to each of said guard rings for providing an indication of the bearing of said intruding craft as it intersects the guard ring associated with the particular bearing indicating means whereby an indication of bearing at the known range of the particular guard ring is provided.

8. An automatic proximity warning device of the character recited in claim 1 in which said alarm and display means includes bearing and range indicating means corresponding to each of said guard rings for storing discrete indications of range and bearing of said intruding craft as it intersects successive guard rings.

9. An automatic proximity warning device of the character recited in claim 1 in which said alarm and display means includes bearing pointer means corresponding to each of said guard rings which rotate synchronously with said sensor means in the absence of an intruding craft and when an intruding craft intersects a particular guard ring defining a predetermined range, the associated bearing pointer means stops rotating to provide an indication of the bearing of the intruding craft at that range whereby an indication of the probability of collision is provided as an intruding craft intersects successive guard rings.

References Cited

UNITED STATES PATENTS 3,005,194 10/1961 Goodell et al. _____ 343—11 X
3,045,231 7/1962 Lakatos et al.
3,052,882 9/1962 Pidhayny et al.

RODNEY D. BENNETT, *Primary Examiner.*

M. F. HUBLER, *Assistant Examiner.*